(12) United States Patent
Ryu et al.

(10) Patent No.: US 11,671,990 B2
(45) Date of Patent: Jun. 6, 2023

(54) TECHNIQUES FOR INDICATING A USER EQUIPMENT CAPABILITY FOR SIMULTANEOUS BEAM UPDATE ACROSS MULTIPLE COMPONENT CARRIERS

(71) Applicant: QUALCOMM Incorporated, San Diego, CA (US)

(72) Inventors: Jung Ho Ryu, Fort Lee, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,975

(22) Filed: Nov. 23, 2020

(65) Prior Publication Data

US 2021/0243750 A1   Aug. 5, 2021

Related U.S. Application Data

(60) Provisional application No. 62/968,978, filed on Jan. 31, 2020.

(51) Int. Cl.
*H04W 72/04*   (2023.01)
*H04B 7/26*   (2006.01)
(Continued)

(52) U.S. Cl.
CPC .......... *H04W 72/51* (2023.01); *H04B 7/2643* (2013.01); *H04W 72/044* (2013.01); *H04W 72/21* (2023.01); *H04W 72/23* (2023.01)

(58) Field of Classification Search
CPC ............. H04W 72/048; H04W 72/044; H04W 72/042; H04W 72/0413; H04B 7/2643
See application file for complete search history.

(56) References Cited

U.S. PATENT DOCUMENTS 10,952,231 B2 * 3/2021 Liou .................... H04W 72/046
11,496,279 B2 * 11/2022 Grant .................... H04L 5/0092
(Continued)

FOREIGN PATENT DOCUMENTS

EP          3451553 A2      3/2019

OTHER PUBLICATIONS

Huawei, et al., "Enhancements on Multi-Beam Operation", 3GPP Draft, 3GPP TSG RAN WG1 Meeting #98, R1-1908067, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051764690, 20 Pages, Retrieved from the Internet: URL: http://www.3gpp.org/ftp/tsg_ran/WG1_RL1/TSGR1_98/Docs/R1-1908067.zip [retrieved on Aug. 17, 2019] The Whole Document, Paragraph [02.4], p. 4-p. 6, Table 1.

(Continued)

*Primary Examiner* — Rasheed Gidado
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may transmit, to a base station, information indicating a capability of the UE to support a simultaneous beam update across multiple component carriers. The UE may receive, from the base station, a beam update command identifying a component carrier configured for the UE based at least in part on the capability of the UE to support the simultaneous beam update across multiple component carriers. The UE may apply the beam update command to one or more component carriers based at least in part on the component carrier identified in the beam update command. Numerous other aspects are provided.

30 Claims, 7 Drawing Sheets

(51) Int. Cl.
    *H04W 72/51*     (2023.01)
    *H04W 72/044*     (2023.01)
    *H04W 72/21*     (2023.01)
    *H04W 72/23*     (2023.01)

(56) References Cited

U.S. PATENT DOCUMENTS

| | | | | |
|---|---|---|---|---|
| 2011/0268087 | A1* | 11/2011 | Kwon | H04L 5/0005 |
| | | | | 370/328 |
| 2016/0337916 | A1* | 11/2016 | Deenoo | H04W 36/0094 |
| 2019/0081687 | A1* | 3/2019 | Sadiq | H04B 7/0408 |
| 2019/0098586 | A1* | 3/2019 | Akkarakaran | H04W 52/246 |
| 2019/0356431 | A1* | 11/2019 | Manolakos | H04B 7/0639 |
| 2021/0014848 | A1* | 1/2021 | Davydov | H04L 5/001 |
| 2021/0105780 | A1* | 4/2021 | Jin | H04W 80/02 |

OTHER PUBLICATIONS

International Search Report and Written Opinion—PCT/US2021/070090—ISA/EPO—dated Apr. 30, 2021.

\* cited by examiner

TECHNIQUES FOR INDICATING A USER EQUIPMENT CAPABILITY FOR SIMULTANEOUS BEAM UPDATE ACROSS MULTIPLE COMPONENT CARRIERS

CROSS-REFERENCE TO RELATED APPLICATION

This Patent application claims priority to U.S. Provisional Patent Application No. 62/968,978, filed on Jan. 31, 2020, entitled "TECHNIQUES FOR INDICATING A USER EQUIPMENT CAPABILITY FOR SIMULTANEOUS BEAM UPDATE ACROSS MULTIPLE COMPONENT CARRIERS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating a user equipment (UE) capability for simultaneous beam update across multiple component carriers.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: transmitting, to a base station, information indicating a capability of the UE to support a simultaneous beam update across multiple component carriers; receiving, from the base station, a beam update command identifying a component carrier configured for the UE based at least in part on the capability of the UE to support the simultaneous beam update across multiple component carriers; and applying the beam update command to one or more component carriers based at least in part on the component carrier identified in the beam update command.

In some aspects, a method of wireless communication, performed by a base station, may include: receiving, from a UE, information indicating a capability of the UE to support a simultaneous beam update across multiple component carriers; and transmitting, to the UE, a beam update command identifying a component carrier configured for the UE based at least in part on the capability of the UE to support the simultaneous beam update across multiple component carriers.

In some aspects, a UE for wireless communication may include a memory and one or more processors operatively coupled to the memory. The memory and the one or more processors may be configured to: transmit, to a base station, information indicating a capability of the UE to support a simultaneous beam update across multiple component carriers; receive, from the base station, a beam update command identifying a component carrier configured for the UE based at least in part on the capability of the UE to support the simultaneous beam update across multiple component carriers; and apply the beam update command to one or more component carriers based at least in part on the component carrier identified in the beam update command.

In some aspects, a base station for wireless communication may include a memory and one or more processors operatively coupled to the memory. The memory and the one or more processors may be configured to: receive, from a UE, information indicating a capability of the UE to support a simultaneous beam update across multiple component carriers; and transmit, to the UE, a beam update command identifying a component carrier configured for the UE based at least in part on the capability of the UE to support the simultaneous beam update across multiple component carriers.

In some aspects, a non-transitory computer-readable medium may store one or more instructions for wireless communication. The one or more instructions, when executed by one or more processors of a UE, may cause the one or more processors to: transmit, to a base station, information indicating a capability of the UE to support a simultaneous beam update across multiple component carriers; receive, from the base station, a beam update command identifying a component carrier configured for the UE based at least in part on the capability of the UE to support the simultaneous beam update across multiple component carriers; and apply the beam update command to one or more component carriers based at least in part on the component carrier identified in the beam update command.

In some aspects, a non-transitory computer-readable medium may store one or more instructions for wireless communication. The one or more instructions, when executed by one or more processors of a base station, may cause the one or more processors to: receive, from a UE, information indicating a capability of the UE to support a simultaneous beam update across multiple component carriers; and transmit, to the UE, a beam update command identifying a component carrier configured for the UE based at least in part on the capability of the UE to support the simultaneous beam update across multiple component carriers.

In some aspects, an apparatus for wireless communication may include: means for transmitting, to a base station, information indicating a capability of the apparatus to support a simultaneous beam update across multiple component carriers; means for receiving, from the base station, a beam update command identifying a component carrier configured for the apparatus based at least in part on the capability of the apparatus to support the simultaneous beam update across multiple component carriers; and means for applying the beam update command to one or more component carriers based at least in part on the component carrier identified in the beam update command.

In some aspects, an apparatus for wireless communication may include: means for receiving, from a UE, information indicating a capability of the UE to support a simultaneous beam update across multiple component carriers; and means for transmitting, to the UE, a beam update command identifying a component carrier configured for the UE based at least in part on the capability of the UE to support the simultaneous beam update across multiple component carriers.

In some aspects, the information indicating the capability of the UE to support the simultaneous beam update across multiple component carriers indicates whether the UE supports a simultaneous transmission configuration indication (TCI) state update across multiple component carriers.

In some aspects, the beam update command identifies a TCI state to be simultaneously activated across multiple component carriers for a downlink receive beam associated with one or more of a physical downlink control channel (PDCCH) or a physical downlink shared channel (PDSCH) based at least in part on the UE supporting the simultaneous TCI state update across multiple component carriers.

In some aspects, the information indicating the capability of the UE to support the simultaneous beam update across multiple component carriers indicates a maximum number of component carrier lists that can be configured for the UE to support the simultaneous TCI state update across multiple component carriers.

In some aspects, the information indicating the capability of the UE to support the simultaneous beam update across multiple component carriers indicates whether the UE supports a simultaneous spatial relation update for an uplink transmit beam across multiple component carriers.

In some aspects, the beam update command identifies a spatial relation to be simultaneously activated across multiple component carriers for an uplink transmit beam associated with one or more of an aperiodic or semi-periodic sounding reference signal (SRS) based at least in part on the UE supporting the simultaneous spatial relation update across multiple component carriers.

In some aspects, the information indicating the capability of the UE to support the simultaneous beam update across multiple component carriers indicates a maximum number of component carrier lists that can be configured for the UE that support the simultaneous spatial relation update across multiple component carriers.

In some aspects, the information indicating whether the UE supports the simultaneous spatial relation update across multiple component carriers applies only to component carriers associated with one or more of a millimeter wave frequency range or a time division duplexing (TDD) configuration.

In some aspects, the beam update command is applied to multiple component carriers in a component carrier list that includes the component carrier identified in the beam update command based at least in part on the UE supporting the simultaneous beam update across multiple component carriers.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
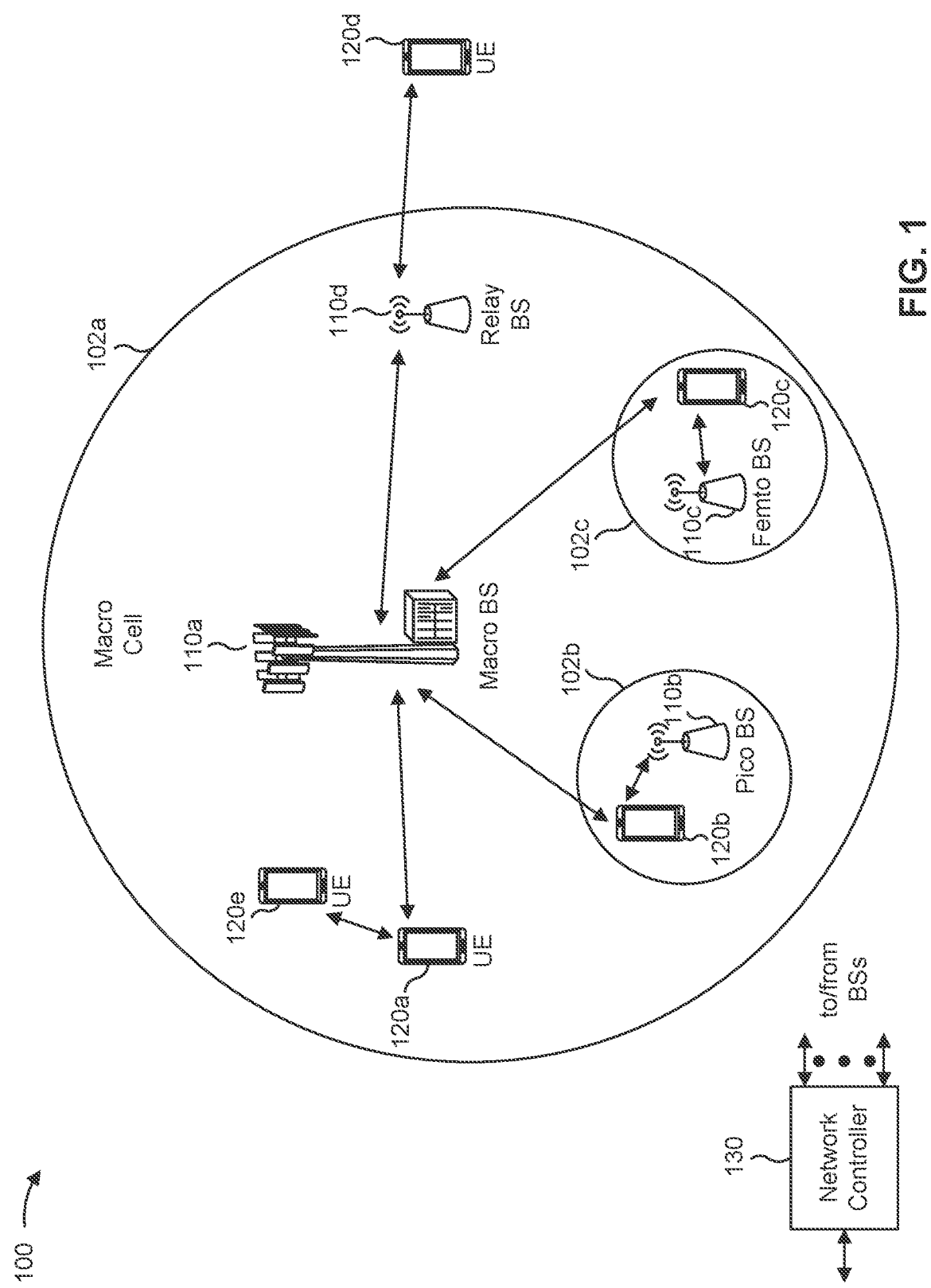
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
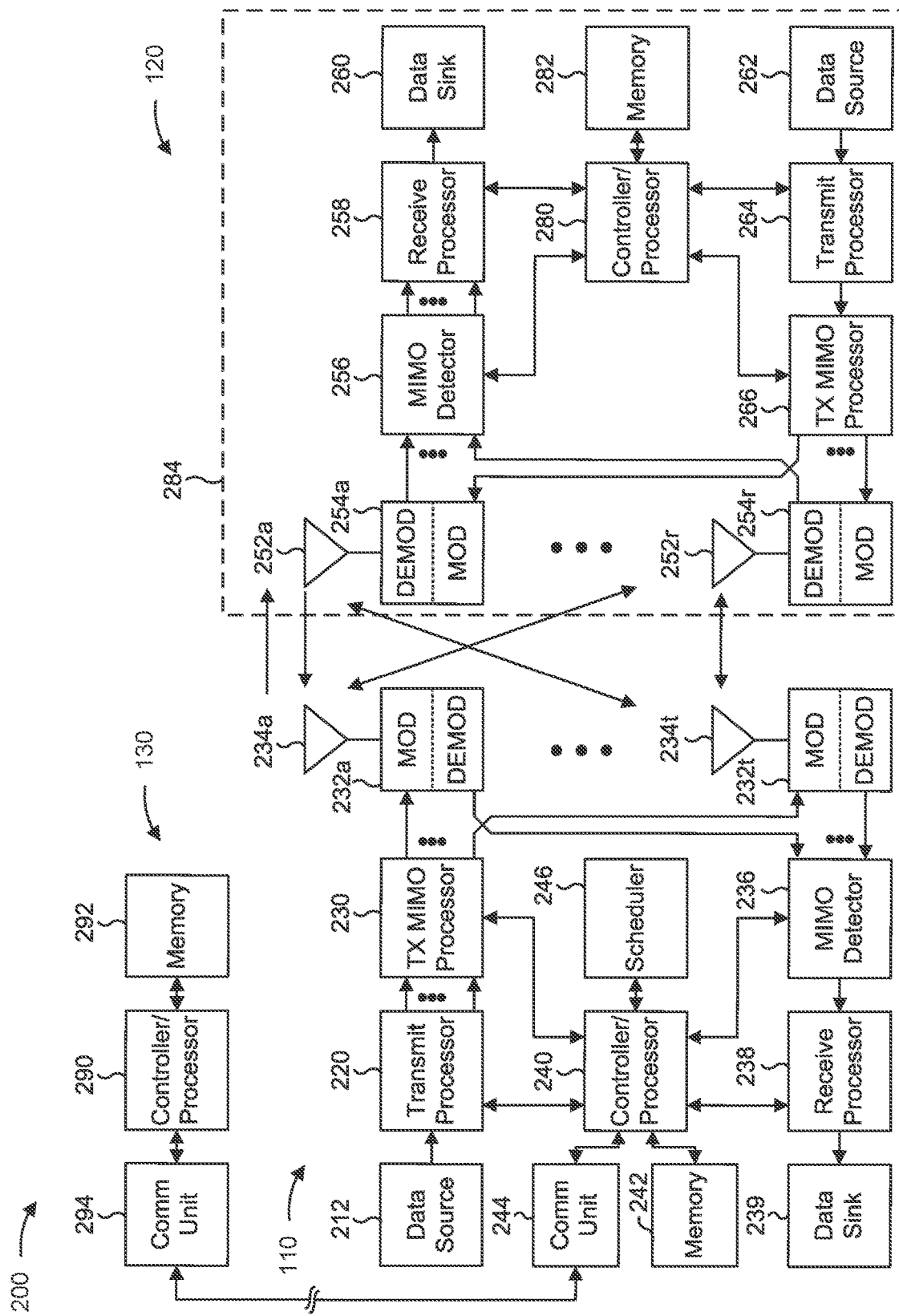
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with indicating a capability of UE 120 for simultaneous beam update across multiple component carriers, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like.

In some aspects, UE 120 may include means for transmitting, to base station 110, information indicating a capability of UE 120 to support a simultaneous beam update across multiple component carriers, means for receiving, from base station 110, a beam update command identifying a component carrier configured for UE 120 based at least in part on the capability of UE 120 to support the simultaneous beam update across multiple component carriers, means for applying the beam update command to one or more component carriers based at least in part on the component carrier identified in the beam update command, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from UE 120, information indicating a capability of UE 120 to support a simultaneous beam update across multiple component carriers, means for transmitting, to UE 120, a beam update command identifying a component carrier configured for UE 120 based at least in part on the capability of UE 120 to support the simultaneous beam update across multiple component carriers, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Wireless communication devices, such as UEs, base stations, transmit-receive points (TRPs), and/or the like, may communicate with each other using beams. For example, a beam may be defined using a transmission configuration indicator (TCI) state associated with a downlink transmit beam used by a base station or a TRP and a corresponding downlink receive beam to be used by a UE. For example, a TCI state for a beam may indicate a source reference signal and a quasi-co-location (QCL) type to be used for the beam. The QCL type may correspond to one or more QCL relationships that indicate how the source reference signal is to be quasi-co-located (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Additionally, or alternatively, a beam may be defined according to a spatial relation. In this case, the spatial relation may indicate an uplink transmit beam to be used by a UE and a corresponding uplink receive beam to be used by a base station or a TRP.

In some cases, a base station and/or a UE may perform downlink and/or uplink beam management. In this case, the base station may configure one or more beam management parameters, activate and/or deactivate one or more uplink and/or downlink beams, and/or the like for the UE. As an example, the base station may configure, activate, deactivate, and/or otherwise update uplink and/or downlink TCI states, such as physical downlink control channel (PDCCH) TCI states, physical downlink shared channel (PDSCH) TCI states, channel state information reference signal (CSI-RS) TCI states, physical uplink control channel (PUCCH) TCI states, physical uplink shared channel (PUSCH) TCI states, physical random access channel (PRACH) TCI states, sounding reference signal (SRS) TCI states, and/or the like. As another example, the base station may configure, activate, deactivate, and/or otherwise update uplink spatial relations (e.g., which may include indications of beam and/or base station co-location, quasi-co-location, and/or the like), such as PUCCH spatial relations, SRS spatial relations, and/or the like.

In some circumstances, a UE and a base station (or any other suitable transmitter device and receiver device) may perform beam management to establish and/or refine the beam management parameters and/or reference signal parameters. Accordingly, beam management may enable intra-cell mobility (e.g., as a physical orientation of a UE changes, as clusters or blocking objects in the channel change, and/or the like) and inter-cell mobility (e.g., when a UE is handed over from one base station to another base station), among other procedures. In some circumstances, beam management procedures may be inefficient. For example, in some cases, a UE and a base station may communicate using carrier aggregation, which refers to technologies that enable multiple component carriers (CCs, sometimes referred to as carriers) to be combined (e. g., into a single channel) for a single UE to enhance data capacity.

For example, carriers can generally be combined in the same or different frequency bands, the same or different frequency ranges, and/or the like. Additionally, or alternatively, contiguous or non-contiguous carriers can be combined. For example, carrier aggregation may be configured in an intra-band contiguous mode where the aggregated carriers are contiguous to one another and are in the same frequency band. Additionally, or alternatively, carrier aggregation may be configured in an intra-band non-contiguous mode where the aggregated carriers are non-contiguous to one another and are in the same frequency band. Additionally, or alternatively, carrier aggregation may be configured in an inter-band non-contiguous mode where the aggregated carriers are non-contiguous to one another and are in different frequency bands. In these and other carrier aggregation cases, performing beam management for each component carrier individually may be inefficient. For example, there may be latency and overhead involved in transmitting and applying multiple beam update commands for the different component carriers.

One technique to reduce the overhead and/or inefficiency of performing beam management in a carrier aggregation scenario is to enable simultaneous beam updates across multiple component carriers. For example, each component carrier configured for a UE may be associated with a downlink receive beam and uplink transmit beam, and in some cases, the component carriers configured for a UE may be near to each other in frequency. Accordingly, if a UE were to use a particular receive beam and/or transmit beam in one component carrier, the UE may also use the same receive beam and/or transmit beam in other component carriers (e.g., neighboring component carriers). In this way, efficiency of a beam management procedure may be improved by simultaneously updating beam information across multiple component carriers. However, in some cases, UEs may not universally support simultaneously applying a beam update command across multiple component carriers (e.g., a UE may only support updating beams for an individual component carrier, may only support simultaneously updating uplink transmit beams across different component carriers, may only support simultaneously updating downlink receive beams across different component carriers, may have different supported configurations for simultaneously updating uplink transmit beams and downlink receive beams across different component carriers, and/or the like). In this regard, without knowing the beam update capabilities supported by a UE (if any), a base station and a UE may be unable to realize the efficiencies of simultaneous beam updates across multiple component carriers.

Figure 3:
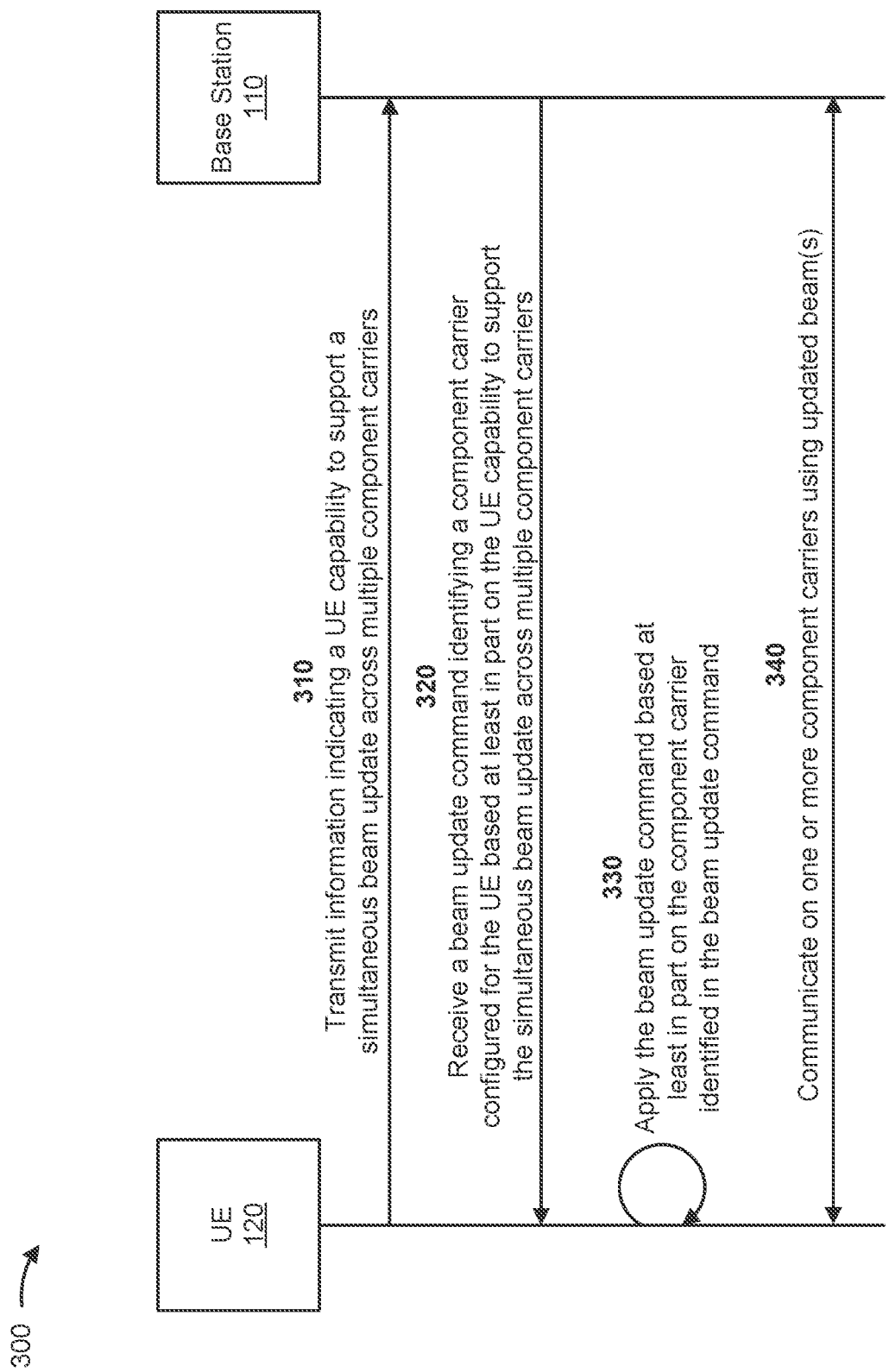
FIG. 3 is a diagram illustrating an example of indicating a UE capability for simultaneous beam update across multiple component carriers, in accordance with various aspects of the present disclosure.

FIG. 3 is a diagram illustrating an example 300 of indicating a UE capability for simultaneous beam update across multiple component carriers, in accordance with various aspects of the present disclosure. As shown in FIG. 3, example 300 includes a UE 120 in communication with a base station 110 over a wireless network (e.g., wireless network 100). In some aspects, as described herein, the UE 120 and the base station 110 may communicate using carrier aggregation across multiple component carriers. Furthermore, in some aspects, as described herein, the UE 120 and the base station 110 may communicate using beams in each component carrier. For example, in each component carrier, the UE 120 may use an uplink transmit beam associated with a spatial relation and the base station 110 may use an uplink receive beam associated with the spatial relation. Similarly, in each component carrier, the UE 120 may use a downlink receive beam associated with a TCI state and the base station 110 may use a downlink transmit beam associated with the TCI state. Accordingly, as described herein, the UE 120 may signal, to the base station 110, a capability to simultaneously apply a beam update command (e.g., with respect to a spatial relation and/or a TCI state) across multiple component carriers.

For example, as shown in FIG. 3, and by reference number 310, the UE 120 may transmit, and the base station 110 may receive, information indicating a capability of the UE 120 to support a simultaneous beam update across multiple component carriers. In some aspects, the UE 120 may separately indicate a capability to support a simultaneous beam update across multiple component carriers for a TCI state and a capability to support a simultaneous beam update across multiple component carriers for a spatial relation. For example, with respect to a TCI state, the indicated capability may indicate whether the UE 120 supports simultaneously applying a beam update command to update a downlink receive beam used to receive a physical downlink control channel (PDCCH) and/or a physical downlink shared channel (PDSCH) across multiple component carriers. Similarly, for a spatial relation, the indicated capability may indicate whether the UE 120 supports simultaneously applying a beam update command to update an uplink transmit beam used to transmit an aperiodic or semi-periodic sounding reference signal (SRS). Furthermore, in some aspects, the indicated capability for simultaneously updating a spatial relation may apply only to component carriers in a millimeter wave frequency range (e.g., Frequency Range 2 (FR2)) and/or component carriers having a time division duplexing (TDD) configuration.

In some aspects, the capability information transmitted to the base station 110 may additionally, or alternatively, indicate a maximum number of component carrier lists configured for the UE 120 (e.g., via radio resource control (RRC) signaling). For example, the UE 120 may be configured with up to two component carrier lists that may be managed simultaneously in a beam update procedure. Accordingly, in some aspects, the UE 120 may indicate the maximum number of component carrier lists that are configured for the UE 120 for which the UE 120 supports simultaneous beam updates, where a candidate value set for the maximum number of component carrier lists may be {0, 1, 2}. In this case, if the UE 120 indicates zero (0) as the maximum number of configured component carrier lists that support simultaneous TCI state activation across multiple component carriers, the indication may be interpreted by the base station 110 to mean that the UE 120 does not support simultaneous TCI state activation across multiple component carriers. Similarly, if the UE 120 indicates zero (0) as the maximum number of configured component carrier lists that support simultaneous spatial relation updates across multiple component carriers, the indication may be interpreted by the base station 110 to mean that the UE 120 does not support simultaneously updating a spatial relation across multiple component carriers. However, when the UE 120 indicates that the maximum number of configured component carrier lists support simultaneous TCI state activation and/or spatial relation updates is one (1) or two (2), a beam update command identifying any component carrier in a list may be applied to all component carriers in the list.

As further shown in FIG. 3, and by reference number 320, the base station 110 may transmit, and the UE 120 may receive, a beam update command identifying a component carrier configured for the UE 120 based at least in part on the capability of the UE 120 to support simultaneous beam updates across multiple component carriers. For example, in some aspects, the beam update command may identify a component carrier configured for the UE 120, and may further indicate an updated TCI state to be activated for the downlink receive beam associated with the component carrier and/or an updated spatial relation to be applied for the uplink transmit beam associated with the component carrier. Furthermore, in cases where the UE 120 indicates a capability to support simultaneous TCI state activation and/or simultaneous spatial relation updates across multiple component carriers, the base station 110 may update each corresponding downlink transmit beam associated with the updated TCI state and/or each corresponding uplink receive beam associated with the updated spatial relation. For example, the base station 110 may identify a component carrier list configured for the UE 120 that includes the component carrier identified in the beam update command and apply the updated TCI state and/or updated spatial relation to each component carrier in the same component carrier list. Alternatively, in cases where the UE 120 indicates a lack of support for simultaneous TCI state activation and/or simultaneous spatial relation updates, the base station 110 may update only the downlink transmit beam and/or the uplink receive beam associated with the component carrier identified in the beam update command.

As further shown in FIG. 3, and by reference number 330, the UE 120 may apply the beam update command based at least in part on the component carrier identified in the beam update command. For example, in cases where the component carrier identified in the beam update command is included in one or more configured component carrier lists that support simultaneous TCI state activation and/or simultaneous spatial relation updates, the UE 120 may apply the beam update command to each component carrier in the same list as the component carrier identified in the beam update command. Furthermore, in some aspects, the beam update command may include a TCI state to be activated for the component carrier identified in the beam update command and/or an updated spatial relation to be applied for the component carrier identified in the beam update command. In this regard, the UE 120 may activate the TCI state indicated in the beam update command and/or apply the updated spatial relation indicated in the beam update command to each component carrier in the same list as the component carrier identified in the beam update command. Alternatively, if the UE 120 does not support simultaneous TCI state activation and/or simultaneous spatial relation updates, or the component carrier identified in the beam update command does not appear in a configured component carrier list that supports simultaneous beam updates, the UE 120 may apply the beam update command to only the component carrier identified in the beam update command.

As further shown in FIG. 3, and by reference number 340, the UE 120 and the base station 110 may communicate on one or more component carriers using the updated beam(s). For example, in some aspects, the base station 110 may transmit a PDCCH and/or a PDSCH to the UE 120 in one or more component carriers using one or more downlink transmit beams that are associated with the updated TCI state, and the UE 120 may receive the PDCCH and/or the PDSCH in the one or more component carriers using one or more downlink receive beams that are associated with the updated TCI state. Additionally, or alternatively, the UE 120 may transmit an aperiodic or semi-periodic SRS to the base station 110 in one or more component carriers that are associated with a millimeter wave frequency range and/or a TDD configuration using one or more uplink transmit beams that are associated with an updated spatial relation, and the base station 110 may receive the aperiodic or semi-periodic SRS in the one or more component carriers using one or more uplink receive beams that are associated with the updated spatial relation.

As indicated above, FIG. 3 is provided as an example. Other examples may differ from what is described with respect to FIG. 3.

Figure 4:
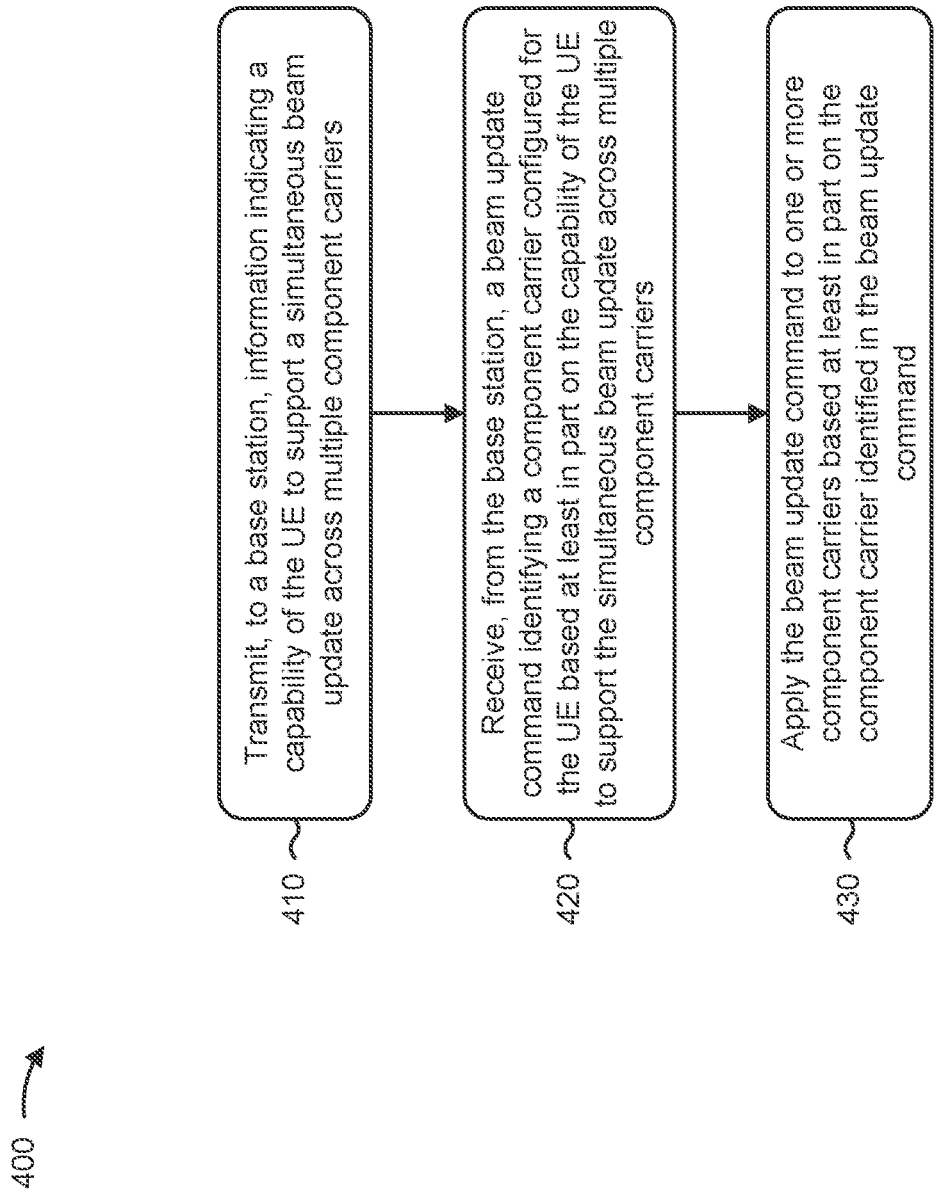
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with indicating a capability of the UE for a simultaneous beam update across multiple component carriers.

As shown in FIG. 4, in some aspects, process 400 may include transmitting, to a base station, information indicating a capability of the UE to support a simultaneous beam update across multiple component carriers (block 410). For example, the UE may transmit (e.g., using controller/processor 280, transmit processor 264, TX MIMO processor 266, MOD 254, antenna 252, and/or the like), to a base station, information indicating a capability of the UE to support a simultaneous beam update across multiple component carriers, as described above.

As further shown in FIG. 4, in some aspects, process 400 may include receiving, from the base station, a beam update command identifying a component carrier configured for the UE based at least in part on the capability of the UE to support the simultaneous beam update across multiple component carriers (block 420). For example, the UE may receive (e.g., using antenna 252, DEMOD 254, MIMO detector 256, receive processor 258, controller/processor 280, memory 282, and/or the like), from the base station, a beam update command identifying a component carrier configured for the UE based at least in part on the capability of the UE to support the simultaneous beam update across multiple component carriers, as described above.

As further shown in FIG. 4, in some aspects, process 400 may include applying the beam update command to one or more component carriers based at least in part on the component carrier identified in the beam update command (block 430). For example, the UE may apply (e.g., using antenna 252, DEMOD 254, MIMO detector 256, receive processor 258, transmit processor 264, TX MIMO processor 266, MOD 254, antenna 252, controller/processor 280, memory 282, and/or the like) the beam update command to one or more component carriers based at least in part on the component carrier identified in the beam update command, as described above.

Process 400 may include additional aspects, such as any single aspect or any combination of aspects described below and/or in connection with one or more other processes described elsewhere herein.

In a first aspect, the information indicating the capability of the UE to support the simultaneous beam update across multiple component carriers indicates whether the UE supports a simultaneous TCI state update across multiple component carriers.

In a second aspect, alone or in combination with the first aspect, the beam update command identifies a TCI state to be simultaneously activated across multiple component carriers for a downlink receive beam associated with one or more of a PDCCH or a PDSCH based at least in part on the UE supporting the simultaneous TCI state update across multiple component carriers.

In a third aspect, alone or in combination with one or more of the first and second aspects, the information indicating the capability of the UE to support the simultaneous beam update across multiple component carriers indicates a maximum number of component carrier lists that can be configured for the UE to support the simultaneous TCI state update across multiple component carriers.

In a fourth aspect, alone or in combination with one or more of the first through third aspects, the information indicating the capability of the UE to support the simultaneous beam update across multiple component carriers indicates whether the UE supports a simultaneous spatial relation update for an uplink transmit beam across multiple component carriers.

In a fifth aspect, alone or in combination with one or more of the first through fourth aspects, the beam update command identifies a spatial relation to be simultaneously activated across multiple component carriers for an uplink transmit beam associated with one or more of an aperiodic or semi-periodic SRS based at least in part on the UE supporting the simultaneous spatial relation update across multiple component carriers.

In a sixth aspect, alone or in combination with one or more of the first through fifth aspects, the information indicating the capability of the UE to support the simultaneous beam update across multiple component carriers indicates a maximum number of component carrier lists that can be configured for the UE that support the simultaneous spatial relation update across multiple component carriers.

In a seventh aspect, alone or in combination with one or more of the first through sixth aspects, the information indicating whether the UE supports the simultaneous spatial relation update across multiple component carriers applies only to component carriers associated with one or more of a millimeter wave frequency range or a TDD configuration.

In an eighth aspect, alone or in combination with one or more of the first through seventh aspects, the one or more component carriers to which the beam update command is applied include multiple component carriers in a component carrier list that includes the component carrier identified in the beam update command based at least in part on the UE supporting the simultaneous beam update across multiple component carriers.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
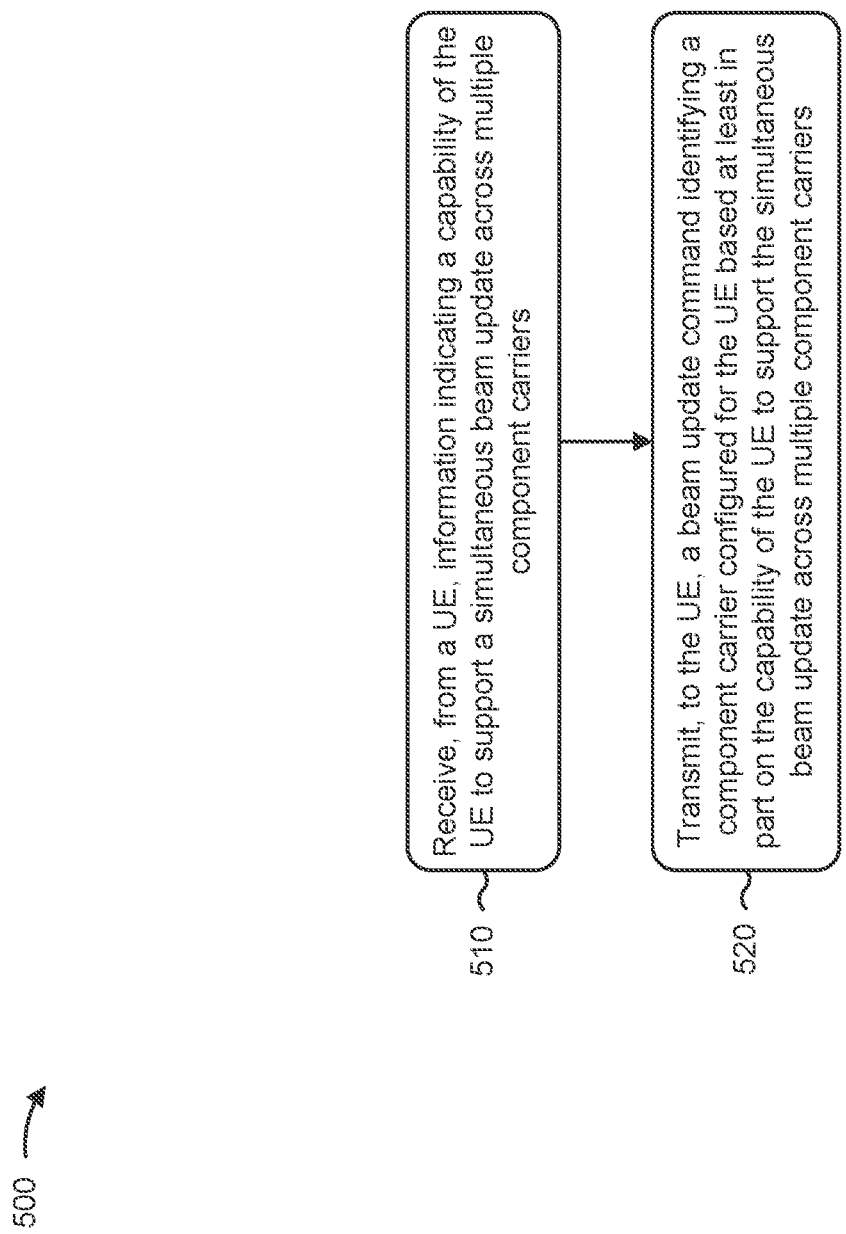
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., base station 110 and/or the like) performs operations associated with an indicated UE capability for a simultaneous beam update across multiple component carriers.

As shown in FIG. 5, in some aspects, process 500 may include receiving, from a UE, information indicating a capability of the UE to support a simultaneous beam update across multiple component carriers (block 510). For example, the base station may receive (e.g., using antenna 234, DEMOD 232, MIMO detector 236, receive processor 238, controller/processor 240, and/or the like), from a UE, information indicating a capability of the UE to support a simultaneous beam update across multiple component carriers, as described above.

As further shown in FIG. 5, in some aspects, process 500 may include transmitting, to the UE, a beam update command identifying a component carrier configured for the UE based at least in part on the capability of the UE to support the simultaneous beam update across multiple component carriers (block 520). For example, the base station may transmit (e.g., using controller/processor 240, transmit processor 220, TX MIMO processor 230, MOD 232, antenna 234, and/or the like), to the UE, a beam update command identifying a component carrier configured for the UE based at least in part on the capability of the UE to support the simultaneous beam update across multiple component carriers, as described above.

Process 500 may include additional aspects, such as any single aspect or any combination of aspects described below and/or in connection with one or more other processes described elsewhere herein.

In a first aspect, the information indicating the capability of the UE to support the simultaneous beam update across multiple component carriers indicates whether the UE supports a simultaneous TCI state update across multiple component carriers.

In a second aspect, alone or in combination with the first aspect, the beam update command identifies a TCI state to be simultaneously activated across multiple component carriers for a downlink receive beam associated with one or more of a PDCCH or a PDSCH based at least in part on the UE supporting the simultaneous TCI state update across multiple component carriers.

In a third aspect, alone or in combination with one or more of the first and second aspects, the information indicating the capability of the UE to support the simultaneous beam update across multiple component carriers indicates a maximum number of component carrier lists that can be configured for the UE to support the simultaneous TCI state update across multiple component carriers.

In a fourth aspect, alone or in combination with one or more of the first through third aspects, the information indicating the capability of the UE to support the simultaneous beam update across multiple component carriers indicates whether the UE supports a simultaneous spatial relation update for an uplink transmit beam across multiple component carriers.

In a fifth aspect, alone or in combination with one or more of the first through fourth aspects, the beam update command identifies a spatial relation to be simultaneously activated across multiple component carriers for an uplink transmit beam associated with one or more of an aperiodic or semi-periodic SRS based at least in part on the UE supporting the simultaneous spatial relation update across multiple component carriers.

In a sixth aspect, alone or in combination with one or more of the first through fifth aspects, the information indicating the capability of the UE to support the simultaneous beam update across multiple component carriers indicates a maximum number of component carrier lists that can be configured for the UE that support the simultaneous spatial relation update across multiple component carriers.

In a seventh aspect, alone or in combination with one or more of the first through sixth aspects, the information indicating whether the UE supports the simultaneous spatial relation update across multiple component carriers applies only to component carriers associated with one or more of a millimeter wave frequency range or a TDD configuration.

In an eighth aspect, alone or in combination with one or more of the first through seventh aspects, the beam update command is to be applied to multiple component carriers in a component carrier list that includes the component carrier identified in the beam update command based at least in part on the UE supporting the simultaneous beam update across multiple component carriers.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
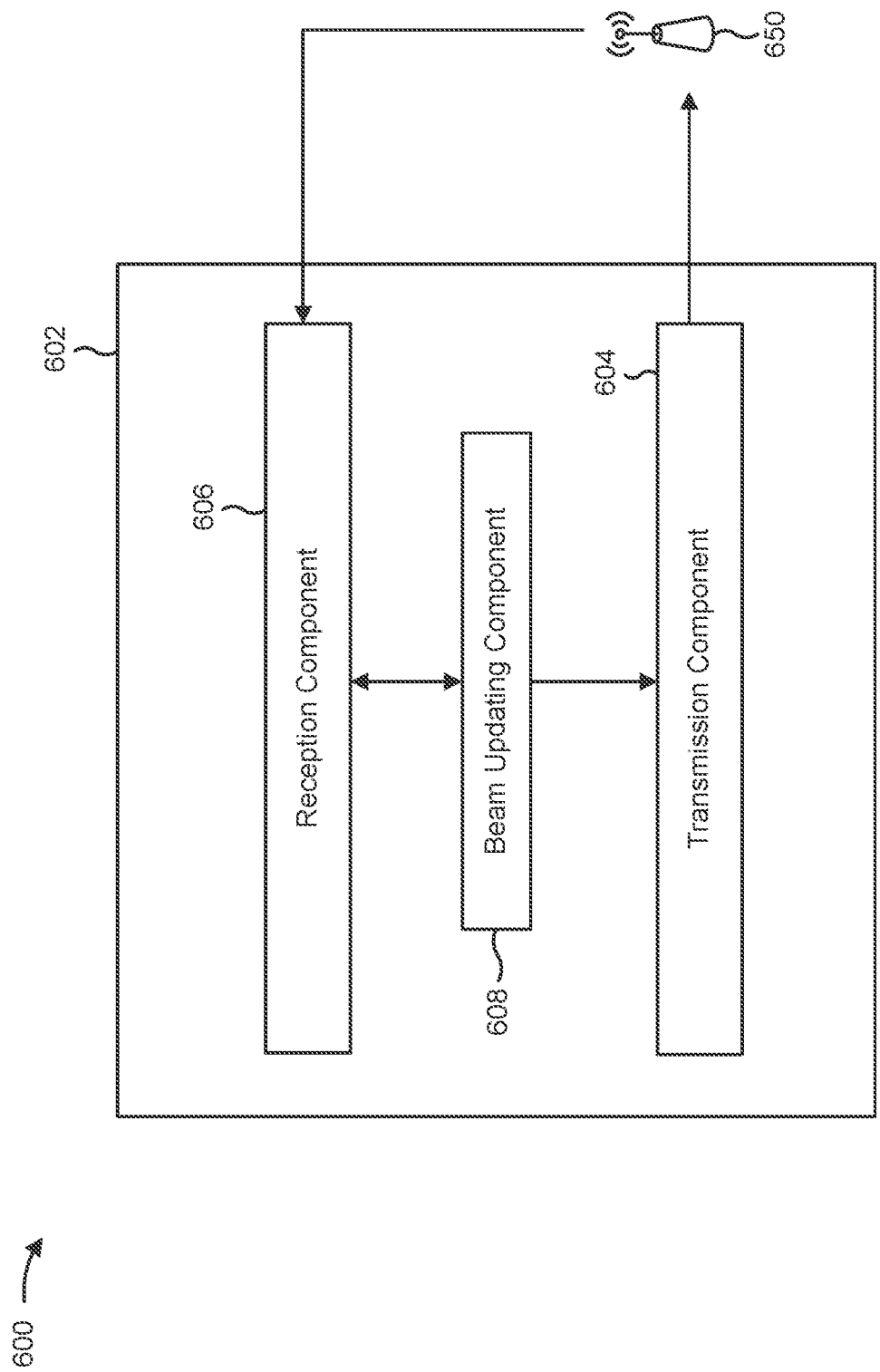
FIGS. 6-7 are diagrams illustrating example data flows between different components in example apparatuses, in accordance with various aspects of the present disclosure.

FIG. 6 is a diagram illustrating an example 600 of a data flow between different components in an example apparatus 602. The apparatus 602 may be a UE (e.g., UE 120). In some aspects, the apparatus 602 includes a transmission component 604, a reception component 606, a beam updating component 608, and/or the like.

The transmission component 604 may transmit (e.g., to an apparatus 650, such as a base station 110) information indicating a capability of the apparatus 602 to support a simultaneous beam update across multiple component carriers. The reception component 606 may receive (e.g., from apparatus 650) a beam update command identifying a component carrier configured for the apparatus 602 based at least in part on the capability of the apparatus 602 to support the simultaneous beam update across multiple component carriers. The beam updating component 608 may apply the beam update command to one or more component carriers based at least in part on the component carrier identified in the beam update command. For example, in some aspects, the beam updating component 608 may communicate with the reception component 606 to update a downlink receive beam associated with one or more component carriers based at least in part on an updated TCI state indicated in the beam update command. Additionally, or alternatively, the beam updating component 608 may communicate with the transmission component 604 to update an uplink transmit beam associated with one or more component carriers based at least in part on an updated spatial relation indicated in the beam update command.

The apparatus 602 may include additional components that perform each of the blocks of the algorithm in the aforementioned process 400 of FIG. 4 and/or the like. Each block in the aforementioned process 400 of FIG. 4 and/or the like may be performed by a component and the apparatus 602 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
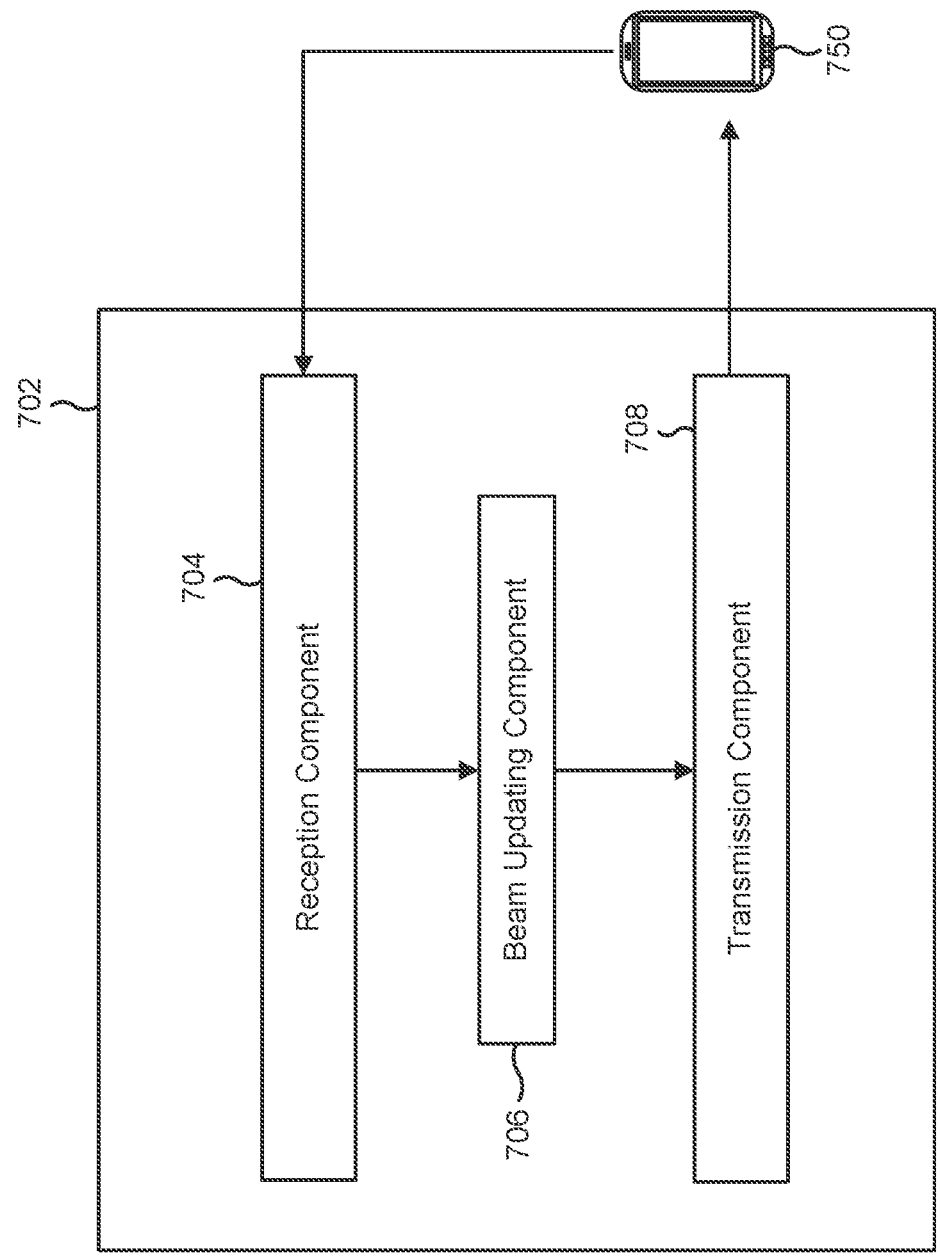

FIG. 7 is a diagram illustrating an example 700 of a data flow between different components in an example apparatus 702. The apparatus 702 may be a base station (e.g., base station 110). In some aspects, the apparatus 702 includes a reception component 704, a beam updating component 706, a transmission component 708, and/or the like.

The transmission component 704 may receive (e.g., from an apparatus 750, such as a UE 120) information indicating a capability of the apparatus 750 to support a simultaneous beam update across multiple component carriers. The beam updating component 706 may generate a beam update command identifying a component carrier configured for the apparatus 750 based at least in part on the capability of the apparatus 750 to support the simultaneous beam update across multiple component carriers. For example, in some aspects, the beam update command may update a downlink receive beam associated with one or more component carriers based at least in part on an updated TCI state. Additionally, or alternatively, the beam update command may update an uplink transmit beam associated with one or more component carriers based at least in part on an updated spatial relation. The transmission component 708 may transmit (e.g., to the apparatus 750) the beam update command.

The apparatus 702 may include additional components that perform each of the blocks of the algorithm in the aforementioned process 500 of FIG. 5 and/or the like. Each block in the aforementioned process 500 of FIG. 5 and/or the like may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The following provides an overview of aspects of the present disclosure:

Aspect 1: A method of wireless communication performed by a UE, comprising: transmitting, to a base station, information indicating a capability of the UE to support a simultaneous beam update across multiple component carriers; receiving, from the base station, a beam update command identifying a component carrier configured for the UE based at least in part on the capability of the UE to support the simultaneous beam update across multiple component carriers; and applying the beam update command to one or more component carriers based at least in part on the component carrier identified in the beam update command.

Aspect 2: The method of aspect 1, wherein the information indicating the capability of the UE to support the simultaneous beam update across multiple component carriers indicates whether the UE supports a simultaneous TCI state update across multiple component carriers.

Aspect 3: The method of aspect 2, wherein the beam update command identifies a TCI state to be simultaneously activated across multiple component carriers for a downlink receive beam associated with one or more of a physical downlink control channel or a physical downlink shared channel based at least in part on the UE supporting the simultaneous TCI state update across multiple component carriers.

Aspect 4: The method of any of aspects 2 through 3, wherein the information indicating the capability of the UE to support the simultaneous beam update across multiple component carriers indicates a maximum number of component carrier lists that can be configured for the UE to support the simultaneous TCI state update across multiple component carriers.

Aspect 5: The method of any of aspects 1 through 4, wherein the information indicating the capability of the UE to support the simultaneous beam update across multiple component carriers indicates whether the UE supports a simultaneous spatial relation update for an uplink transmit beam across multiple component carriers.

Aspect 6: The method of aspect 5, wherein the beam update command identifies a spatial relation to be simultaneously activated across multiple component carriers for an uplink transmit beam associated with one or more of an aperiodic or semi-periodic sounding reference signal based at least in part on the UE supporting the simultaneous spatial relation update across multiple component carriers.

Aspect 7: The method of any of aspects 5 through 6, wherein the information indicating the capability of the UE to support the simultaneous beam update across multiple component carriers indicates a maximum number of component carrier lists that can be configured for the UE that support the simultaneous spatial relation update across multiple component carriers.

Aspect 8: The method of any of aspects 5 through 7, wherein the information indicating whether the UE supports the simultaneous spatial relation update across multiple component carriers applies only to component carriers associated with one or more of a millimeter wave frequency range or a time division duplexing configuration.

Aspect 9: The method of any of aspects 1 through 8, wherein the one or more component carriers to which the beam update command is applied include multiple component carriers in a component carrier list that includes the component carrier identified in the beam update command based at least in part on the UE supporting the simultaneous beam update across multiple component carriers.

Aspect 10: A method of wireless communication performed by a base station, comprising: receiving, from a UE, information indicating a capability of the UE to support a simultaneous beam update across multiple component carriers; and transmitting, to the UE, a beam update command identifying a component carrier configured for the UE based at least in part on the capability of the UE to support the simultaneous beam update across multiple component carriers.

Aspect 11: The method of aspect 10, wherein the information indicating the capability of the UE to support the simultaneous beam update across multiple component carriers indicates whether the UE supports a simultaneous TCI state update across multiple component carriers.

Aspect 12: The method of aspect 11, wherein the beam update command identifies a TCI state to be simultaneously activated across multiple component carriers for a downlink receive beam associated with one or more of a physical downlink control channel or a physical downlink shared channel based at least in part on the UE supporting the simultaneous TCI state update across multiple component carriers.

Aspect 13: The method of any of aspects 11 through 12, wherein the information indicating the capability of the UE to support the simultaneous beam update across multiple component carriers indicates a maximum number of component carrier lists that can be configured for the UE to support the simultaneous TCI state update across multiple component carriers.

Aspect 14: The method of any of aspects 10 through 13, wherein the information indicating the capability of the UE to support the simultaneous beam update across multiple component carriers indicates whether the UE supports a simultaneous spatial relation update for an uplink transmit beam across multiple component carriers.

Aspect 15: The method of aspect 14, wherein the beam update command identifies a spatial relation to be simultaneously activated across multiple component carriers for an uplink transmit beam associated with one or more of an aperiodic or semi-periodic sounding reference signal based at least in part on the UE supporting the simultaneous spatial relation update across multiple component carriers.

Aspect 16: The method of any of aspects 14 through 15, wherein the information indicating the capability of the UE to support the simultaneous beam update across multiple component carriers indicates a maximum number of component carrier lists that can be configured for the UE that support the simultaneous spatial relation update across multiple component carriers.

Aspect 17: The method of any of aspects 14 through 16, wherein the information indicating whether the UE supports the simultaneous spatial relation update across multiple component carriers applies only to component carriers associated with one or more of a millimeter wave frequency range or a time division duplexing configuration.

Aspect 18: The method of any of aspects 10 through 17, wherein the beam update command is to be applied to multiple component carriers in a component carrier list that includes the component carrier identified in the beam update command based at least in part on the UE supporting the simultaneous beam update across multiple component carriers.

Aspect 19: An apparatus for wireless communication at a device, comprising a processor; memory coupled with the processor; and instructions stored in the memory and executable by the processor to cause the apparatus to perform the method of any of aspects 1-9.

Aspect 20: A device for wireless communication, comprising a memory and one or more processors coupled to the memory, the memory and the one or more processors configured to perform the method of any of aspects 1-9.

Aspect 21: An apparatus for wireless communication, comprising at least one means for performing the method of any of aspects 1-9.

Aspect 22: A non-transitory computer-readable medium storing code for wireless communication, the code comprising instructions executable by a processor to perform the method of any of aspects 1-9.

Aspect 23: A non-transitory computer-readable medium storing a set of instructions for wireless communication, the set of instructions comprising one or more instructions that, when executed by one or more processors of a device, cause the device to perform the method of any of aspects 1-9.

Aspect 24: An apparatus for wireless communication at a device, comprising a processor; memory coupled with the processor; and instructions stored in the memory and executable by the processor to cause the apparatus to perform the method of any of aspects 10-18.

Aspect 25: A device for wireless communication, comprising a memory and one or more processors coupled to the memory, the memory and the one or more processors configured to perform the method of any of aspects 10-18.

Aspect 26: An apparatus for wireless communication, comprising at least one means for performing the method of any of aspects 10-18.

Aspect 27: A non-transitory computer-readable medium storing code for wireless communication, the code comprising instructions executable by a processor to perform the method of any of aspects 10-18.

Aspect 28: A non-transitory computer-readable medium storing a set of instructions for wireless communication, the set of instructions comprising one or more instructions that, when executed by one or more processors of a device, cause the device to perform the method of any of aspects 10-18.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting, to a network entity, information indicating a capability of the UE to support a simultaneous spatial relation across multiple component carriers, wherein the information indicating the capability of the UE to support the simultaneous spatial relation across multiple component carriers applies only to component carriers associated with a millimeter wave frequency range;
    receiving, from the network entity and based at least in part on the capability of the UE to support the simultaneous spatial relation across multiple component carriers, a beam update command identifying a spatial relation to be simultaneously activated across a plurality of component carriers; and
    applying the beam update command based at least in part on a component carrier of the plurality of component carriers.

2. The method of claim 1, further comprising:
transmitting other information indicating whether the UE supports a simultaneous transmission configuration indication (TCI) state update across multiple component carriers.

3. The method of claim 2, wherein the beam update command further identifies a TCI state to be simultaneously activated across multiple component carriers for one or more of a physical downlink control channel or a physical downlink shared channel based at least in part on the UE supporting the simultaneous TCI state update across multiple component carriers.

4. The method of claim 2, wherein the information indicating the capability of the UE to support the simultaneous spatial relation across multiple component carriers indicates a maximum number of component carrier lists that can be configured for the UE to support the simultaneous TCI state update across multiple component carriers.

5. The method of claim 1, wherein the information indicating the capability of the UE to support the simultaneous spatial relation across multiple component carriers indicates whether the UE supports a simultaneous spatial relation update for an uplink transmit beam across multiple component carriers.

6. The method of claim 5, wherein the beam update command identifies the spatial relation to be simultaneously activated across the plurality of component carriers for the uplink transmit beam based at least in part on the UE supporting the simultaneous spatial relation update.

7. The method of claim 5, wherein the information indicating the capability of the UE to support the simultaneous spatial relation across multiple component carriers indicates a maximum number of component carrier lists that can be configured for the UE that support the simultaneous spatial relation update.

8. The method of claim 1, wherein the beam update command is applied to multiple component carriers in a component carrier list that includes the component carrier based at least in part on the UE supporting the simultaneous spatial relation across multiple component carriers.

9. A method of wireless communication performed by a network entity, comprising:
receiving, from a user equipment (UE), information indicating a capability of the UE to support a simultaneous spatial relation across multiple component carriers, wherein the information indicating the capability of the UE to support the simultaneous spatial relation across multiple component carriers applies only to component carriers associated with a millimeter wave frequency range; and
transmitting, to the UE and based at least in part on the capability of the UE to support the simultaneous spatial relation across multiple component carriers, a beam update command identifying a spatial relation to be simultaneously activated across a plurality of component carriers.

10. The method of claim 9, further comprising:
receiving other information indicating whether the UE supports a simultaneous transmission configuration indication (TCI) state update across multiple component carriers.

11. The method of claim 10, wherein the beam update command further identifies a TCI state to be simultaneously activated across multiple component carriers for one or more of a physical downlink control channel or a physical downlink shared channel based at least in part on the UE supporting the simultaneous TCI state update across multiple component carriers.

12. The method of claim 10, wherein the information indicating the capability of the UE to support the simultaneous spatial relation across multiple component carriers indicates a maximum number of component carrier lists that can be configured for the UE to support the simultaneous TCI state update across multiple component carriers.

13. The method of claim 9, wherein the information indicating the capability of the UE to support the simultaneous spatial relation across multiple component carriers indicates whether the UE supports a simultaneous spatial relation update for an uplink transmit beam across multiple component carriers.

14. The method of claim 13, wherein the beam update command identifies the spatial relation to be simultaneously activated across the plurality of component carriers for the uplink transmit beam based at least in part on the UE supporting the simultaneous spatial relation update.

15. The method of claim 13, wherein the information indicating the capability of the UE to support the simultaneous spatial relation across multiple component carriers indicates a maximum number of component carrier lists that can be configured for the UE that support the simultaneous spatial relation update.

16. The method of claim 9, wherein the beam update command is to be applied to multiple component carriers in a component carrier list that includes the component carrier based at least in part on the UE supporting the simultaneous spatial relation across multiple component carriers.

17. A user equipment (UE) for wireless communication, comprising:
a memory; and
one or more processors, coupled to the memory, configured to:
transmit, to a network entity, information indicating a capability of the UE to support a simultaneous spatial relation across multiple component carriers, wherein the information indicating the capability of the UE to support the simultaneous spatial relation across multiple component carriers applies only to component carriers associated with a millimeter wave frequency range;
receive, from the network entity and based at least in part on the capability of the UE to support the simultaneous spatial relation across multiple component carriers, a beam update command identifying a spatial relation to be simultaneously activated across a plurality of component carriers; and
apply the beam update command based at least in part on a component carrier of the plurality of component carriers.

18. The UE of claim 17, wherein the one or more processors are further configured to:
transmit other information indicating whether the UE supports a simultaneous transmission configuration indication (TCI) state update across multiple component carriers.

19. The UE of claim 18, wherein the beam update command further identifies a TCI state to be simultaneously activated across multiple component carriers for one or more of a physical downlink control channel or a physical downlink shared channel based at least in part on the UE supporting the simultaneous TCI state update across multiple component carriers.

20. The UE of claim 18, wherein the information indicating the capability of the UE to support the simultaneous spatial relation across multiple component carriers indicates a maximum number of component carrier lists that can be configured for the UE to support the simultaneous TCI state update across multiple component carriers.

21. The UE of claim 17, wherein the information indicating the capability of the UE to support the simultaneous spatial relation across multiple component carriers indicates whether the UE supports a simultaneous spatial relation update for an uplink transmit beam across multiple component carriers.

22. The UE of claim 21, wherein the beam update command identifies the spatial relation to be simultaneously activated across multiple component carriers for the uplink transmit beam based at least in part on the UE supporting the simultaneous spatial relation update.

23. The UE of claim 21, wherein the information indicating the capability of the UE to support the simultaneous spatial relation across multiple component carriers indicates a maximum number of component carrier lists that can be configured for the UE that support the simultaneous spatial relation update.

24. The UE of claim 17, wherein the plurality of component carriers are associated with a sounding reference signal.

25. A network entity for wireless communication, comprising:
a memory; and
one or more processors, coupled to the memory, configured to:
receive, from a user equipment (UE), information indicating a capability of the UE to support a simultaneous spatial relation across multiple component carriers, wherein the information indicating the capability of the UE to support the simultaneous spatial relation across multiple component carriers applies only to component carriers associated with a millimeter wave frequency range; and
transmit, to the UE and based at least in part on the capability of the UE to support the simultaneous spatial relation across multiple component carriers, a beam update command identifying a spatial relation to be simultaneously activated across a plurality of component carriers.

26. The network entity of claim 25, wherein the one or more processors are further configured to: transmit other information indicating whether the UE supports a simultaneous transmission configuration indication (TCI) state update across multiple component carriers.

27. The network entity of claim 26, wherein the beam update command further identifies a TCI state to be simultaneously activated across multiple component carriers for one or more of a physical downlink control channel or a physical downlink shared channel based at least in part on the UE supporting the simultaneous TCI state update across multiple component carriers.

28. The network entity of claim 25, wherein the information indicating the capability of the UE to support the simultaneous spatial relation across multiple component carriers indicates whether the UE supports a simultaneous spatial relation update for an uplink transmit beam across multiple component carriers.

29. The network entity of claim 28, wherein the beam update command identifies the spatial relation to be simultaneously activated across multiple component carriers for the uplink transmit beam based at least in part on the UE supporting the simultaneous spatial relation update.

30. The network entity of claim 25, wherein the plurality of component carriers are associated with a sounding reference signal.

* * * * *